(12) United States Patent
Johnson et al.

(10) Patent No.: US 10,186,910 B2
(45) Date of Patent: Jan. 22, 2019

(54) SIGNAL COMPARISON AND DIRECTION

(71) Applicant: The United States of America, as represented by the Secretary of the Army, Washington, DC (US)

(72) Inventors: Rex Johnson, Perryville, MD (US); Marianne Lazzaro, Churchville, MD (US); Matthew Lazzaro, Churchville, MD (US); William Toth, Ocean, NJ (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 223 days.

(21) Appl. No.: 15/210,934

(22) Filed: Jul. 15, 2016

(65) Prior Publication Data
US 2018/0019620 A1    Jan. 18, 2018

(51) Int. Cl.
*H02J 7/02*    (2016.01)
*H02J 50/20*    (2016.01)
*H04L 12/26*    (2006.01)

(52) U.S. Cl.
CPC .............. *H02J 50/20* (2016.02); *H02J 7/025* (2013.01); *H04L 43/16* (2013.01)

(58) Field of Classification Search
CPC ......... H02J 50/20; H02J 7/025; H04W 64/00; H04B 1/3883; H04B 17/318; H04B 1/0003; H04L 43/16
See application file for complete search history.

(56) References Cited

U.S. PATENT DOCUMENTS

| | | | |
|---|---|---|---|
| 5,602,903 A | 2/1997 | LeBlanc et al. | |
| 6,904,266 B1 * | 6/2005 | Jin ..................... | H04B 7/15571 370/279 |
| 7,477,196 B2 | 1/2009 | Asrani et al. | |
| 7,642,897 B2 | 1/2010 | Karabinis | |
| 7,657,240 B2 | 2/2010 | Bonesteel et al. | |
| 7,710,204 B2 | 5/2010 | Karoui et al. | |
| 8,351,961 B2 | 1/2013 | Olbers et al. | |
| 8,416,063 B2 | 4/2013 | Jung et al. | |
| 8,489,030 B2 | 7/2013 | Moritsuka et al. | |
| 8,541,975 B2 | 9/2013 | Park et al. | |
| 8,552,597 B2 | 10/2013 | Song et al. | |
| 8,780,596 B2 | 7/2014 | Song et al. | |
| 8,867,451 B2 | 10/2014 | Kummetz et al. | |
| 8,886,135 B2 | 11/2014 | Hyvonen et al. | |
| 8,912,785 B2 | 12/2014 | Horvath | |
| 8,938,239 B2 | 1/2015 | Kherani et al. | |
| 9,237,211 B2 | 1/2016 | Tabe | |

(Continued)

*Primary Examiner* — Nay A Maung
*Assistant Examiner* — Maryam Soltanzadeh
(74) *Attorney, Agent, or Firm* — Ronald Krosky; Azza Jayaprakash

(57) ABSTRACT

Various embodiments are described that relate to directing of a signal. An incoming signal can be compared to a threshold voltage. If the signal does not meet the threshold voltage, then the signal can be used for normal usage, such as communication with a software-defined radio. However, if the signal does meet the threshold, then the signal can be directed away from normal usage. In one example, the signal can be directed away from a communication component and directed to an energy harvesting component that charges a battery of the software-defined radio.

16 Claims, 6 Drawing Sheets

(56) References Cited

U.S. PATENT DOCUMENTS

| | | |
|---|---|---|
| 9,325,067 B2 | 4/2016 | Ali et al. |
| 9,369,165 B1 | 6/2016 | Gaikwad et al. |
| 9,392,560 B2 | 7/2016 | Mu et al. |
| 2010/0233963 A1* | 9/2010 | Harada ................. H04W 16/14 455/63.3 |
| 2012/0187851 A1* | 7/2012 | Huggins ................. H02J 7/025 315/159 |
| 2014/0270306 A1* | 9/2014 | Luna ........................ H04R 3/00 381/334 |
| 2015/0200463 A1 | 7/2015 | Heikura et al. |
| 2016/0154039 A1 | 6/2016 | Shen |
| 2016/0181873 A1* | 6/2016 | Mitcheson ............. H01Q 1/248 307/104 |
| 2017/0208560 A1* | 7/2017 | Papa .................... H04W 56/006 |
| 2017/0353847 A1* | 12/2017 | Coulis ................... H04W 8/005 |

* cited by examiner

SIGNAL COMPARISON AND DIRECTION

GOVERNMENT INTEREST

The innovation described herein may be manufactured, used, imported, sold, and licensed by or for the Government of the United States of America without the payment of any royalty thereon or therefor.

BACKGROUND

A radio can be used as a communication device. The radio can receive a wireless signal that communicates information. In one example, the wireless signal can contain voice information. After reception, the radio can process the wireless signal such that the voice information is broadcast by way of a speaker. Similarly, the radio can transmit a wireless signal that contains voice information. These radios can be susceptible to damage from various factors.

SUMMARY

In one embodiment, a system comprises a comparison component and a direction component. The comparison component can be configured to compare an incoming signal level of an incoming signal against a threshold level. The direction component can be configured to direct the incoming signal away from a communication component when the incoming signal level meets the threshold. The comparison component, the direction component, or a combination thereof can be implemented, at least in part, by way of hardware.

In one embodiment, a system comprises a mobile communication device and a component set. The mobile communication device can comprise an antenna set to communicate a radio frequency signal, energy storage hardware configured to provide operational energy to the mobile communication device by way of the radio frequency signal, communication processor hardware configured to cause the mobile communication device to transmit and to process the radio frequency signal; and charger hardware configured to charge the energy storage hardware. The component set, that can be resident upon the mobile communication device, can comprise a charger direction component configured to direct the radio frequency signal, when obtained, away from the communication processor hardware and toward the charger hardware when a signal level of the radio frequency signal meets a voltage threshold and a communication direction component configured to direct the radio frequency signal, when obtained, toward the communication processor hardware and away from the charger hardware when the signal level of the radio frequency signal does not meet the voltage threshold.

In one embodiment, a method can comprise identifying a location of a mobile communication device. The method can also comprise determining a radio frequency band of the location. The method can additionally comprise causing a communication frequency of the mobile communication device to be within the radio frequency band of the location.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
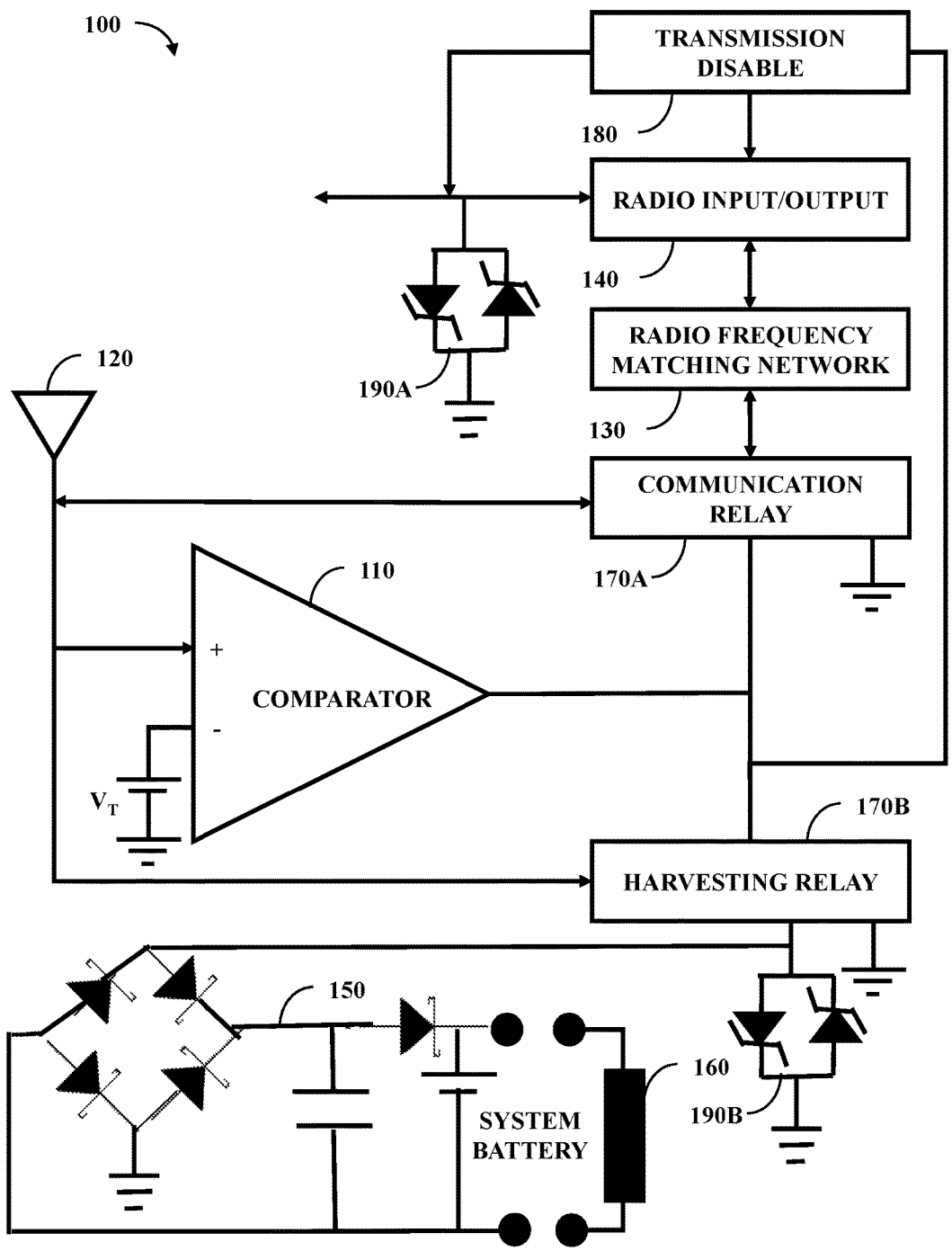
FIG. 1 illustrates one embodiment of a system comprising a comparator.

In one embodiment, a radio can receive a signal that is compared against a threshold and, based on a result of this comparison, the signal is directed to a specific location. The radio can be a software-defined radio that can be sensitive to a large amount of energy. When the energy is too large, in comparison to a threshold, the energy can be directed away from sensitive communication components. In one embodiment, the energy that is too large can be directed to energy charging circuitry to charge a battery or another energy storage component, such as a capacitor. Therefore, two benefits can simultaneously occur—energy can be harvested while internal radio components can be protected. While radios are addressed herein, aspects disclosed herein can be practiced on other electronic devices where energy can be used for a purpose or diverted to charge an energy store based on one or more criterion.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a comparator 110. An antenna 120 can receive a signal that is sensed at the comparator 110. This signal can have a high radio frequency level and therefore a high amount of energy. If this high amount of energy were to be received by sensitive electronics—such as a radio frequency matching network 130 and/or a radio input/output 140 (e.g., for a relatively prolonged period of time)—these sensitive electronics could be damaged. Therefore, it is desirable to direct a high energy signal away from the sensitive electronics.

This directing can be performed by the comparator 110. The comparator 110 can be configured to compare an incoming signal level of an incoming signal against a threshold level. This threshold level can be a preset voltage threshold and the incoming signal level can be an energy (e.g., defined as a voltage). As part of the comparison of the incoming signal level against the threshold level, the comparator 110 can determine if the incoming signal level meets the threshold (e.g., is greater than the threshold or is greater than or equal to the threshold).

Depending on if the incoming signal meets the threshold, the comparator 110 can perform different functions. The comparator 110 can be configured to direct the incoming signal away from a communication component (e.g., the radio frequency matching network 130 and/or the radio input/output 140) when the incoming signal level meets the threshold. Conversely, the comparator 110 can be configured to direct the incoming signal toward the communication component when the incoming signal level does not meet the threshold. The communication component can processes the incoming signal after the incoming signal is directed to the communication component.

When the comparator 110 directs the incoming signal away from the communication component (e.g., when the signal level meets the threshold), the comparator 110 can direct the incoming signal to a power capture component 150 configured to produce usable energy from the incoming signal. The power capture component 150 can use the incoming signal to charge a battery 160 of the radio.

To successfully direct the incoming signal to an appropriate destination, the system 100 can employ a relay set comprising a communication relay 170A and a harvesting relay 170B. These relays can function in two states—open and closed. When the incoming signal does not meet the threshold, then the communication relay 170A can be closed allowing the incoming signal to reach the communication component and the harvesting relay 170B can be open to prevent the incoming signal to reach the power capture component. Conversely, when the incoming signal does meet the threshold, then the communication relay 170A can be open and the harvesting relay 170B can be closed. In one embodiment, the system 100 employs an AND gate to manage opening and closing of the relays 170A and 170B and the comparator 110 can direct control signals to the relays 170A and 170B.

The system 100, when functioning as a radio, can receive the incoming signal within a radio frequency band (e.g., a radio frequency range or a radio frequency single value). When the radio frequency band is heavily occupied, then the incoming signal level can be high. In addition to this being too much energy that could damage the radio, the incoming signal can be too noisy to capture a desired transmission. Therefore, directing the incoming signal away from the communication component after reception can be beneficial outside of stopping potential damage—a noisy signal may just waste processing and battery power since the desired transmission may not be identifiable despite efforts of the communication component.

The system 100 can function with a transmission function along with a reception function, such that the radio input/output 140 functions as a transmission component. When the radio frequency band is heavily occupied (e.g., a lot of signals are present within a small range of frequencies) it can be challenging for a successful transmission. Therefore, a transmission disable 180 can be employed to disable transmission when the incoming signal meets the threshold.

However, a scenario can occur where even when the incoming signal level meets the threshold, a user of the radio can desire to attempt to receive the transmission. In other words, even though it may damage the radio and even though success may be limited, the user would still want to attempt to receive the transmission. In this example, the radio can be a push-to-talk radio of a wounded soldier. Even if chances are low and the radio may be damaged, the soldier would want to send out a distress signal in view of the severity of the injuries. The transmission disable 180 can function as an identification component configured to identify a transmission request and can function as an override component configured to cause the incoming signal to be directed to the communication component when the incoming signal level meets the threshold, such that the direction component does not direct the incoming signal away from the communication component when the incoming signal level meets the threshold. With this scenario, the communication relay 170A can remain closed and the harvesting relay 170B can remain open unless the incoming signal level surpasses the threshold and the system 100 is not used for transmission.

In one embodiment, the threshold can be set to a number based on a value of energy harvesting. If the communication relay 170A or the harvesting relay 170B is closed, too much voltage can be mitigated by a Zener diode pair 190A or 190B for the respective relay (e.g., one Zener diode has its anode connected to a positive terminal and its cathode to ground while another Zener diode has its anode connected to ground while its cathode is connected to the positive terminal). Therefore, the threshold can be used to set a specific value for energy harvesting. If a voltage of an incoming signal is too low, then it can be inefficient to try to charge the system battery 160. Therefore, the incoming signal can be directed to the communication component until the incoming signal has voltage significant enough to make charging of the system battery 160 worthwhile. Similarly, if the system battery is at or near full charge, then the threshold can be ignored since energy harvesting would be of little-to-no value.

Figure 2:
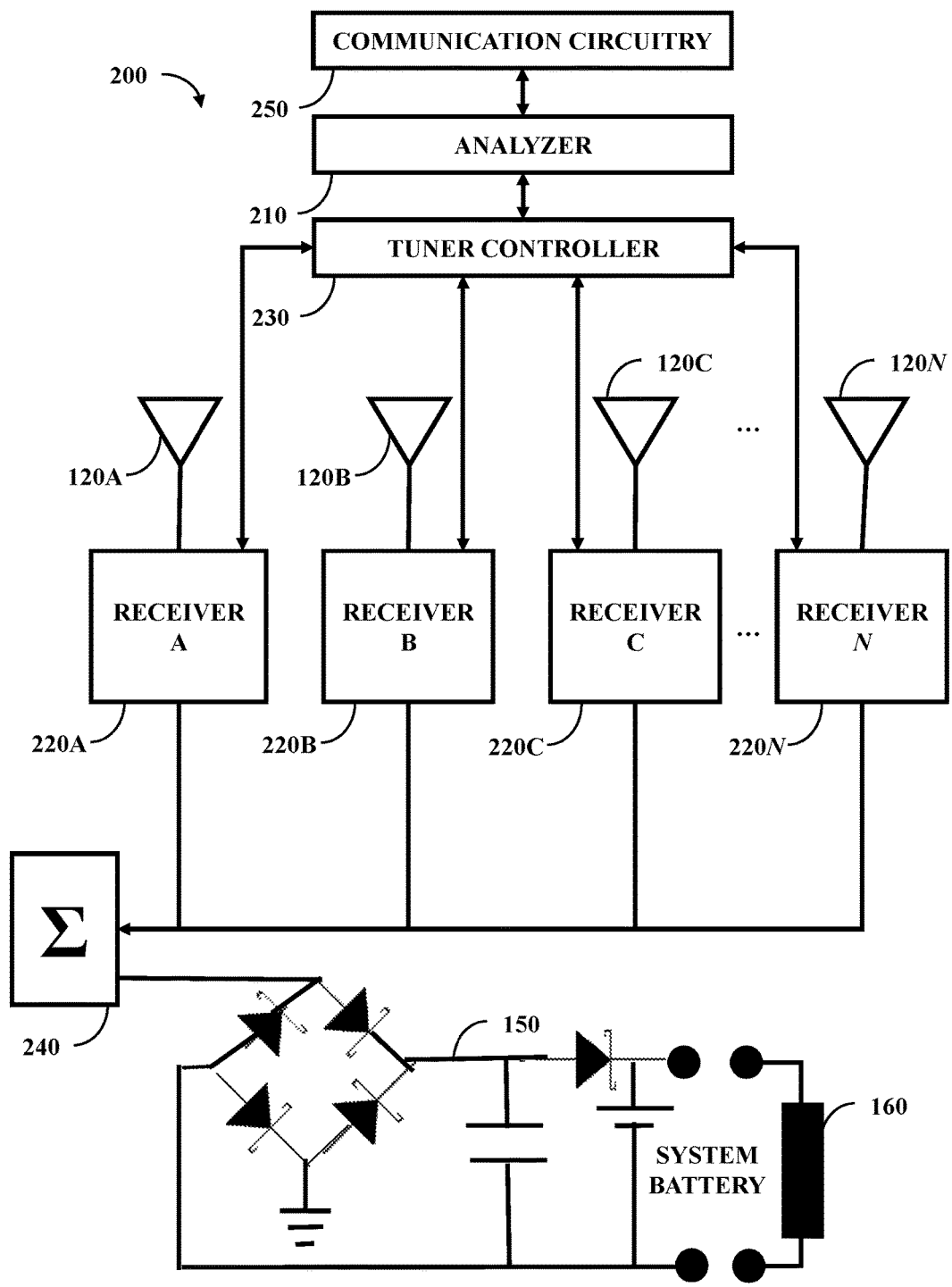
FIG. 2 illustrates one embodiment of a system comprising an analyzer.

FIG. 2 illustrates one embodiment of a system 200 comprising an analyzer 210. The system 200 can be a radio, such as a software-defined radio or hardware-based radio, and can combine with aspects discussed with FIG. 1. The system 200 can have a set of receivers 220A-220N each with an antenna 120A-120N, with N being a representative placeholder. While four receivers are illustrated, more or less can be used. The receivers can receive the incoming signal and the incoming signal can be transferred to the analyzer 210 (e.g., passed through a tuner controller 230 as illustrated or transferred directly to the analyzer 210). The analyzer 210 can be configured to determine a frequency band (e.g., frequency range or specific frequency) of the incoming signal and the tuner controller 230 can be configured to tune the antennas 120A-120N to the frequency band. The analyzer 210 can employ other antennas to gain more spectrum-based information on the incoming signal.

In one example, the incoming signal can be received by the receivers 220A-220N. The incoming signal can be analyzed by the analyzer 210 to determine whether the incoming signal is within a radio frequency band at 100 Kilohertz (kHz). The antennas 120A-120N can be directional facing four different directions (e.g., when N=4 and therefore there are four receivers). The antennas 120A-120N can cover about 90 degrees and therefore cover a total of 360 degrees. Each of these antennas 120A-120N can be tuned to 100 kHz to maximize reception of the incoming signal.

With the above example where the incoming signal is 100 kHz, different implementations can also occur outside of tuning the four antennas 120A-120N to the same frequency. The antennas 120A-120N, in one instance, may not be directional and therefore overlap their coverage area. Therefore, it can be less beneficial to have all receivers tuned the same since they will simply be doing redundant tasks. With this, antenna 120A can be tuned to 100 kHz, antenna 120B can be tuned to 100.1 kHz, antenna 120C can be tuned to 99.9 kHz, and antenna 120N can be tuned to 100.2 kHz. This way if the incoming signal has slight deviation, an antenna can be tuned to that deviation. Additionally, weaker or distorted versions of the incoming signal can be captured by the antennas 120A-120N and fused together by a fusion center 240.

While the above examples discuss the antennas 120A-120N working together, the antennas 120A-120N can function independently. Continuing the above scenario, the analyzer 210 can determine that the incoming signal is at 100 kHz. The tuner controller 230 can tune the antenna 120A to 100 kHz, but leave antennas 120B-120N untouched. A second incoming signal can be processed by the analyzer 210 to be identified at 900 kHz. The antenna 120B can be tuned to 900 kHz while antenna 120A remains at 100 kHz. This way, antennas 120A and 120B can be configured to receive different signals simultaneously.

The analyzer 210 can determine the frequency of the incoming signal in various manners. In one embodiment, the analyzer 210 employs a spectrum analyzer. The spectrum analyzer can detect a change in a received spectrum to identify the frequency of the incoming signal as well as detect modulation (e.g., determine a type of detected modulation).

In one embodiment, the system 200 (e.g., along with the system 100 of FIG. 1) is retained by a housing. The analyzer 210 can determine a location of the housing, such as through use of a global positioning system. The analyzer 210 can access a database (e.g., also retained by the housing) to compare the location with an associated base station—a base station that services that location. The base station can have an operating frequency and that operating frequency can be designated as the frequency of the incoming signal.

As discussed above, aspects of the system 100 of FIG. 1 can integrate with the system 200. The comparator 110 of FIG. 1 can direct the incoming signal to communication circuitry 250 (e.g., the radio frequency matching network 130 of FIG. 1 and/or the radio input/output 140 of FIG. 1). Also, the comparator 110 of FIG. 1 can direct the incoming signal to the power capture component 150 to charge the system battery 160.

Figure 3:
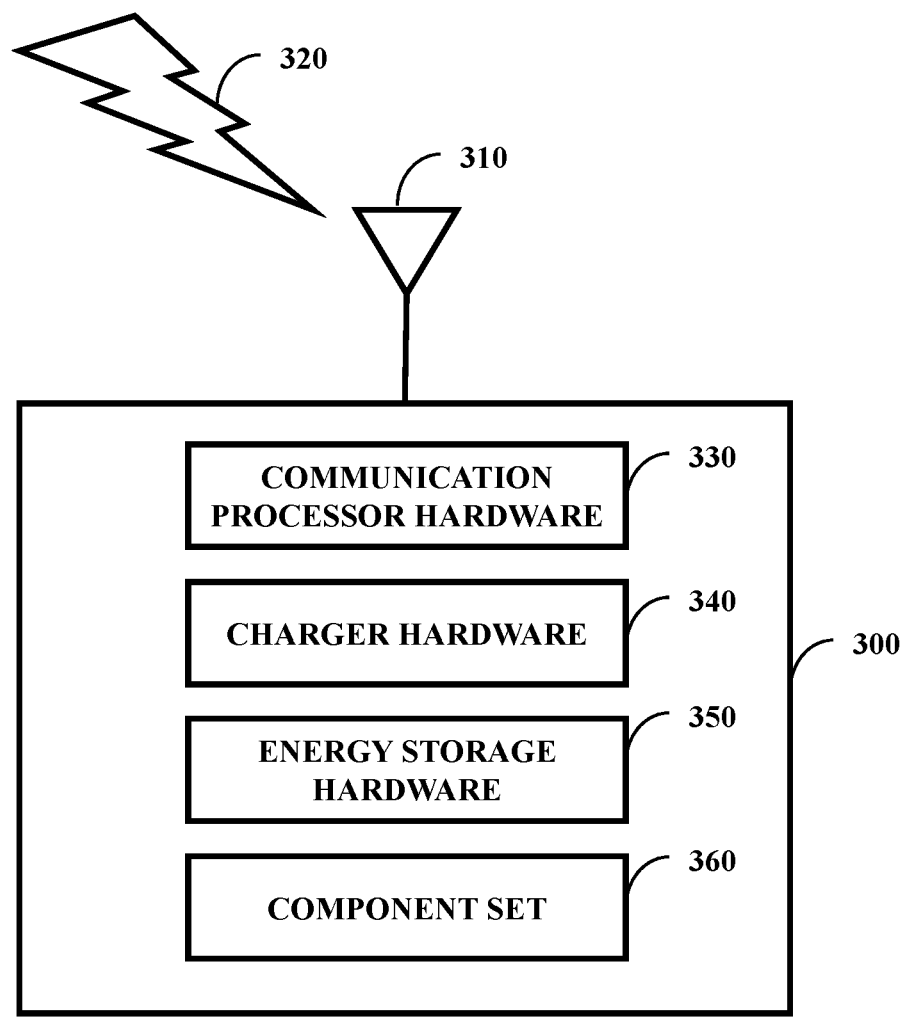
FIG. 3 illustrates one embodiment of a mobile communication device.

FIG. 3 illustrates one embodiment of a mobile communication device 300 (otherwise referred to as a "mobile device" or "communication device"). An antenna set 310 (one antenna or more) can communicate a radio frequency signal 320. Communication processor hardware 330 can be configured to cause the mobile communication device 300 to transmit and to process the radio frequency signal 320. The charger hardware component 340 can be configured to charge an energy storage hardware 350 that is configured to provide operational energy to the mobile communication device 300 by way of the radio frequency signal 320.

A component set 360 can be resident upon the communication device 300. The component set can comprise a charger direction component configured to direct the radio frequency signal 320, when obtained, away from the communication processor hardware 330 and toward the charger hardware 340 when a signal level of the radio frequency signal 320 meets a voltage threshold. The component set can also comprise a communication direction component configured to direct the radio frequency signal 320, when obtained, toward the communication processor hardware 330 and away from the charger hardware 340 when the signal level of the radio frequency signal 320 does not meet the voltage threshold.

In one example, the charger direction component and the communication direction component can implement as the communication relay 170A of FIG. 1 and the harvesting relay 170B of FIG. 1. Therefore, the relays 170A and 170B, both of FIG. 1, can be part of the mobile device 300, along with other aspects of FIGS. 1 and 2 (e.g., the tuner controller 230 of FIG. 2). As one example, the mobile device 300 can comprise the comparator 110 of FIG. 1. The comparator 110 of FIG. 1 can be configured to compare a voltage (e.g., signal level) of the radio frequency signal 320 against the threshold voltage, to produce a comparator result. The relays 170A and 170B can open and close based on the comparator result. The arrangement of the comparator 110 and relays 170A and 170B, all of FIG. 1, can be arranged together on the mobile device 300 as illustrated in FIG. 1.

The mobile device 300 can comprise a display. An output component, of the component set 360, can be configured to cause output of a notice (e.g., upon the display) when the signal level meets the threshold. This notice can indicate that reception of the radio frequency signal is not available (e.g., due to the signal level meeting the threshold.) Additionally, the component set can include an inference component configured to make an inference based, at least in part, on the radio frequency signal 320. In one example, the inference can be that the communication device 300 is being jammed and/or that enemy combatants are nearby and the notice can indicate the result of these inferences.

In one embodiment, the notice can also indicate that transmission is unavailable. In this embodiment, transmission disablement cannot be overridden until the signal level no longer meets the threshold. However, as discussed above, scenarios can exist when overriding transmission disablement is desirable.

In one example scenario, the mobile device 300 can be a cellular telephone and transmission of a 911 emergency call can occur even if there are too many other signals. The mobile device 300 can attempt transmission despite reception of the radio frequency signal not being available. The mobile device 300 can continue to attempt transmission until transmission is successful (e.g., the mobile device 300 receives a confirmation from an intended recipient of the transmission).

The component set 360 can cause the mobile device 300 to be harmonized with the radio frequency signal 320. The component set can comprise a partner component configured to determine a radio frequency of operation for a communication partner of the mobile communication device 300. The communication partner can transmit at the radio frequency of operation and the component set can employ a tuner component configured to tune the antenna set 310 to the radio frequency of operation.

In one embodiment, the communication partner is a base station. The component set 360 can comprise a database component configured to retain a list of base stations and individual radio frequencies associated with the individual base stations. Listed base stations can be possible communication partners of the mobile device 300. A position component, also of the component set 360, can be configured to determine a position of the mobile communication device 300. The partner component can determine the base station that services the position and from that determine, through employment of the database component, the radio frequency of operation. In one example, the partner component identifies a corresponding radio frequency to the base station in a database and appoints the corresponding radio frequency as the radio frequency of operation for tuning the antenna set 310.

The component set can be predictive with regard to the radio frequency signal and in turn how the antenna set 310 is tuned. In one example, the antenna set 310 can comprise two antennas—a first antenna and a second antenna. The first antenna can be tuned to a first base station that services a current position of the mobile device 300. A person holding the mobile device 300 can be travelling in a certain direction and/or be following a map on the mobile device 300. The component set can employ a prediction component configured to predict the next base station of the mobile device 300.

In one embodiment, the component set comprises a spectrum analysis component configured to analyze the radio frequency signal 320 such that an analysis result is produced that indicates the radio frequency of operation. The partner component can be configured to determine the radio frequency of operation through evaluation of the analysis result. This can be a continuous process—the spectrum analysis component can continuously analyze the radio frequency signal 320 to determine if a change in radio frequency occurs and subsequent modification can occur when appropriate.

Figure 4:
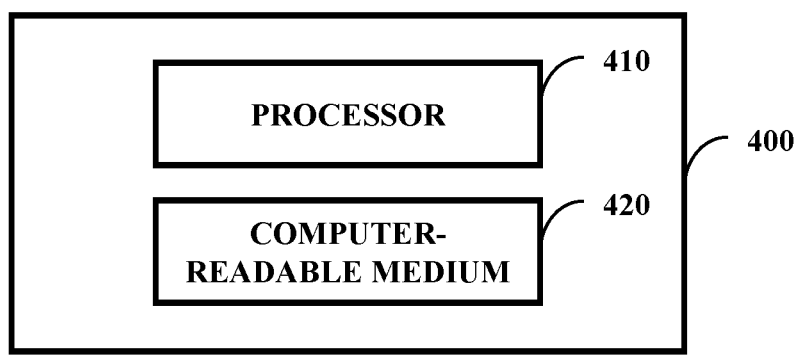
FIG. 4 illustrates one embodiment of a system comprising a processor and a computer-readable medium.

FIG. 4 illustrates one embodiment of a system 400 comprising a processor 410 (e.g., a general purpose processor or a processor specifically designed for performing a functionality disclosed herein) and a computer-readable medium 420 (e.g., non-transitory computer-readable medium). The processor 410 and/or the computer-readable medium 420 can be used for various purposes in accordance with aspects disclosed herein. In one example, the computer-readable medium 420 can function as a database that retains a list of base stations and associated radio frequencies as discussed above and the processor 410 can function as part of the analyzer 210 of FIG. 2. In one embodiment, the computer-readable medium 420 is communicatively coupled to the processor 410 and stores a command set executable by the processor 410 to facilitate operation of at least one component disclosed herein (e.g., the spectrum analysis component discussed as being part of the component set 360). In one embodiment, at least one component disclosed herein (e.g., the identification component discussed above) can be implemented, at least in part, by way of non-software, such as implemented as hardware by way of the system 400. In one embodiment, the computer-readable medium 420 is configured to store processor-executable instructions that when executed by the processor 410, cause the processor 410 to perform a method disclosed herein (e.g., the methods 500-600 addressed below).

Figure 5:
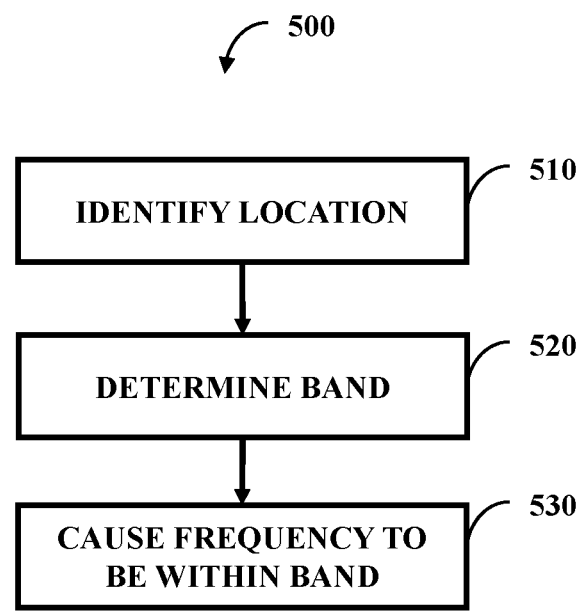
FIG. 5 illustrates one embodiment of a method comprising three actions.

FIG. 5 illustrates one embodiment of a method 500 comprising three actions 510-530. At 510, there is identifying a location of a device, such as the mobile communication device 300 of FIG. 3. In one embodiment, identifying the location of the mobile communication device 300 of FIG. 3 comprises identifying the location of the mobile communication device 300 of FIG. 3 by way of a global positioning component resident upon the mobile communication device 300 of FIG. 3. At 520, there is determining a radio frequency band of the location. In one embodiment, this determination can be done by way of a database radio frequency band entry stored in a database (e.g., the computer-readable medium 420 of FIG. 4) that is retained on the mobile communication device 300 of FIG. 3. In one embodiment, determining a radio frequency band of the location comprises employing spectrum analysis to determine a specific radio frequency entry of a radio frequency hyper-band. The hyper-band can be larger than the radio frequency band and the specific radio frequency entry can be about a singular radio frequency within the radio frequency band. In one example, the radio frequency hyper-band is from about 3 kHz to about 300 GigaHertz, the radio frequency band is from about 5.1 kHz to about 5.2 kHz, and the specific radio frequency is about 5.14 kHz plus/minus a tolerance. At 530, causing a communication frequency of the mobile communication device to be within the radio frequency band of the location occurs, such as causing the communication frequency to be at the singular radio frequency.

Figure 6:
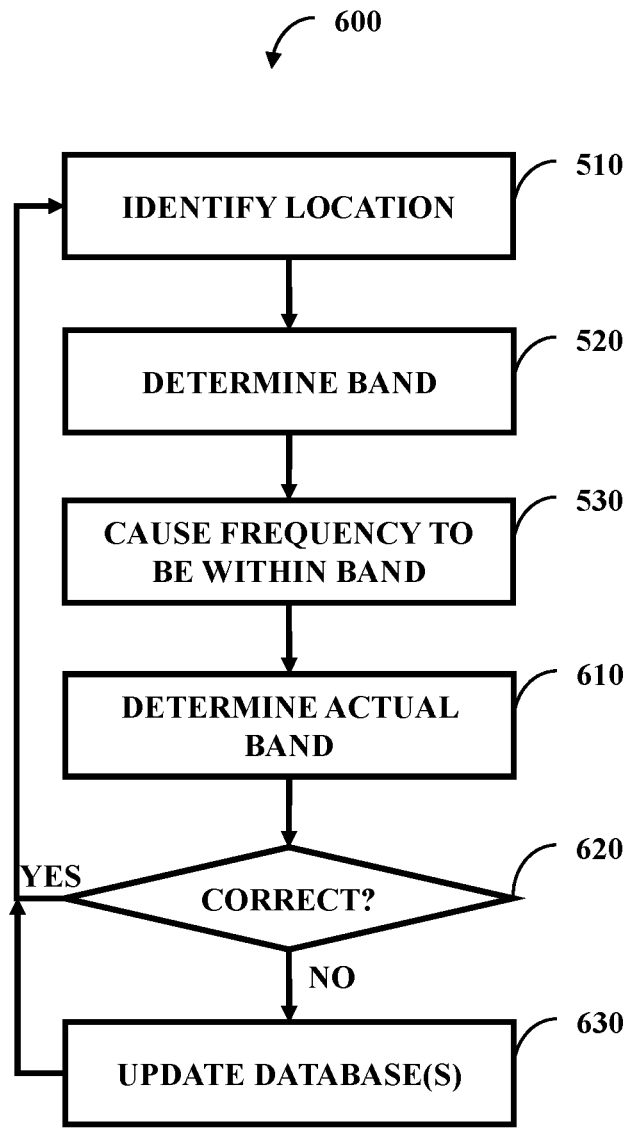
FIG. 6 illustrates one embodiment of a method comprising six actions.

FIG. 6 illustrates one embodiment of a method 600 comprising six actions 510-530 and 610-630. Actions 510-530 can occur as discussed above. At 610, determining an actual frequency band of the location can take place. At 620, a check can take place contrasting the actual frequency band against the database radio frequency band entry such that a contrast result is produced. When the contrast result indicates a discrepancy between the actual frequency band and the pre-update database radio frequency band entry, then at 630 updating the database radio frequency band entry to reflect the actual frequency band takes place. When complete or when an update is not appropriate, then the method 600 can return to action 510.

An update can occur for more than one mobile device. As part of action 630, communicating the actual frequency band to a second mobile communication device can occur. The second mobile communication device can make an update of a database resident upon the second mobile communication device. The update can be of a database radio frequency band entry retained by the database resident upon the second mobile communication device to reflect the actual frequency band.

In one example, a plurality of mobile devices can be in communication with one another. When manufactured, these mobile devices can have a database with radio frequency entries for various base stations and/or other transmission entities. As time passes, the base stations can have their operating radio frequency change. Once one mobile device identifies the change, then the mobile device can not only update its own database in accordance with the change, but also send a notice to other mobile devices so they can update their own respective databases.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
a comparison component configured to compare an incoming signal level of an incoming signal against a threshold level; and
a charger direction component configured to direct the incoming signal away from a communication processor hardware of a mobile communication device and toward a charger hardware of the mobile communication device when a signal level of the incoming signal meets the threshold level; and
a communication direction component configured to direct the incoming signal toward the communication processor hardware and away from the charger hardware when the signal level of the incoming signal does not meet the voltage threshold
where the comparison component, the charger component, the communication component, or a combination thereof is implemented, at least in part, upon the mobile communication device.

2. The system of claim 1, comprising:
a communication component configured to cause transmission from the mobile communication device; and
a management component configured to disable transmission of the communication component when the incoming signal level meets the threshold.

3. The system of claim 1, comprising:
an antenna configured to receive the incoming signal that is then accessed by the comparison component;
an identification component configured to determine a frequency band of the incoming signal; and
a tuner component configured to tune the antenna to the frequency band,
where the incoming signal is within a radio frequency range.

4. The system of claim 3, comprising:
a housing that retains the comparison component, the charger component, the communication direction component, the antenna, the identification component, and the tuner component; and
a position component configured to determine a location of the housing,
where the identification component is configured to determine the frequency band of the incoming signal thorough determination of a base station that services the location and
where the housing retains the position component.

5. A system, comprising:
a mobile communication device, comprising:
an antenna set to communicate a radio frequency signal;
energy storage hardware configured to provide operational energy to the mobile communication device by way of the radio frequency signal;
communication processor hardware configured to cause the mobile communication device to transmit and to process the radio frequency signal; and
charger hardware configured to charge the energy storage hardware; and
a component set that is resident upon the mobile communication device, the component set comprising:
a charger direction component configured to direct the radio frequency signal, when obtained, away from the communication processor hardware and toward the charger hardware when a signal level of the radio frequency signal meets a voltage threshold; and
a communication direction component configured to direct the radio frequency signal, when obtained, toward the communication processor hardware and away from the charger hardware when the signal level of the radio frequency signal does not meet the voltage threshold.

6. The system of claim 5, the component set comprising:
an output component configured to cause output of a notice when the signal level meets the voltage threshold,
where the notice indicates, when the signal level meets the threshold, that reception of the radio frequency signal is not available.

7. The system of claim 6,
where the mobile communication device is configured to attempt transmission despite reception of the radio frequency signal not being available,
where the notice is presented upon a display of the mobile communication device.

8. The system of claim 5, the mobile communication device comprising:
a comparator configured to compare a voltage of the radio frequency signal against the voltage threshold to produce a comparator result,
where the charger direction component and the communication direction component function as a relay set to open and close based on the comparator result.

9. The system of claim 5, the component set comprising:
a partner component configured to determine a radio frequency of operation for a communication partner of the mobile communication device; and
a tuner component configured to tune the antenna set to the radio frequency of operation.

10. The system of claim 9,
the mobile communication device comprising a non-transitory computer-readable medium configured to retain a list of individual base stations and individual radio frequencies associated with the individual base stations and
the component set comprising a position component configured to determine a position of the mobile communication device,
where the partner component is configured to determine the individual base station that services the position and from that determine, through employment of the database component, the radio frequency of operation and
where the communication partner is a base station.

11. The system of claim 9, the component set comprising:
a spectrum analysis component configured to analyze the radio frequency signal such that an analysis result is produced that indicates the radio frequency of operation,
where the partner component determines the radio frequency of operation through evaluation of the analysis result.

12. The system of claim 5,
where the mobile communication device is a software-defined radio.

13. The system of claim 10, the component set comprising:
a management component configured to disable an ability of the antenna set to transmit the radio frequency signal when the signal level of the radio frequency signal meets the voltage threshold.

14. The system of claim 10, the component set comprising:
a frequency determination component configured to determine an actual frequency of the base station;
a contrast component configured to contrast the actual frequency against a list entry of the list for a retained frequency that corresponds to the base station; and
an update component configured to update the list entry with the actual frequency when the contrast results in a difference between the actual frequency and the retained frequency.

15. The system of claim 14, where the mobile communication device is a first mobile communication device, the component set comprising:
a propagation component configured to cause the actual frequency to be communicated to a second mobile communication device,
where the second mobile communication device makes an update of a database resident upon the second mobile communication device and
where the update is of a database radio frequency band entry retained by the database resident upon the second mobile communication device to reflect the actual frequency.

16. The system of claim 3, the partner component comprising:
a base station determination component configured to determine a base station used by a supplier of the incoming signal; and
a frequency determination component configured to determine a radio frequency of the base station,
where the radio frequency of the based station is determined to be the radio frequency of operation and
where partner component accesses a database with a table correlating base station to radio frequency to determine the radio frequency of the base station.

* * * * *